United States Patent Office 3,793,331
Patented Feb. 19, 1974

3,793,331
3-HYDROXY-QUINOPHTHALONE DYESTUFFS
Dietmar Kalz, Cologne, Rütger Neeff, Leverkusen, and Gerhard Wolfrum, Opladen, Germany, assignors to Bayer Aktiengesellschaft, Leverkusen, Germany
No Drawing. Filed Oct. 22, 1970, Ser. No. 83,238
Claims priority, application Germany, Nov. 19, 1969,
P 19 58 097.3
Int. Cl. C07d 33/56
U.S. Cl. 260—289 QP    6 Claims

ABSTRACT OF THE DISCLOSURE

3' - hydroxy - quinophthalone dyestuffs which are free from sulphonic acid groups and correspond to the formula

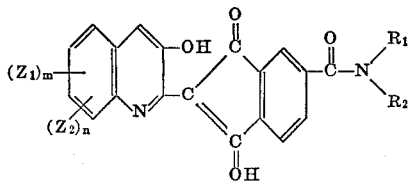

in which $R_1$ and $R_2$, independently of one another, stand for a $C_1$–$C_{17}$-alkyl radical, with the proviso that the sum total of carbon atoms contained in $R_1$ and $R_2$ amounts to at least 16, preferably to 16 to 25;
$Z_1$ stands for a halogen atom, a nitro, $C_1$–$C_4$-alkyl, $C_1$–$C_4$-alkoxy or an acylamino group;
$m$ is a number from 0 to 3;
$Z_2$ is a fused benzene ring; and
$n$ is 1 or, preferably, 0, and a process for their production. The dyestuffs are especially suitable for the dyeing of synthetic fiber materials from organic solvents.

---

The present invention relates to quinophthalone dyestuffs; more particularly it concerns new 3'-hydroxy-quinophthalone dyestuffs which are free from sulphonic acid groups and correspond to the formula

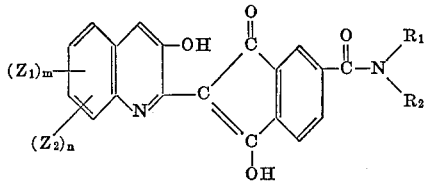

in which $R_1$ and $R_2$, independently of one another, stand for a $C_1$–$C_{17}$-alkyl radial, with the proviso that the sum total of carbon atoms contained in $R_1$ and $R_2$ amounts to at least 16, preferably to 16 to 25;
$Z_1$ stands for a halogen atom, a nitro, a $C_1$–$C_4$-alkyl, $C_1$–$C_4$-alkoxy or an acylamino group;
$m$ is a number from 0 to 3;
$Z_2$ is a fused benzene ring; and
$n$ is 1 or, preferably, 0, to a process for their production and to their use for the dyeing of synthetic fibre materials from organic solvents.

$C_1$–$C_{17}$-alkyl radicals for $R_1$ and $R_2$ are, for example: the methyl, ethyl, propyl, iso-propyl, n-butyl, iso-butyl, sec.-butyl, tert.-butyl, n-pentyl, iso-amyl, sec.-pentyl, neopentyl, n-hexyl, methyl-pentyl, dimethyl-butyl, n-heptyl, methyl-hexyl, dimethyl-pentyl, trimethyl-butyl, n-octyl, iso-octyl, methyl-heptyl, dimethyl-hexyl, trimethyl-pentyl, tetra-methyl-butyl, n-nony, iso-nonyl, dimethyl-heptyl, trimethyl-hexyl, decyl, undecyl, dodecyl, tridecyl, tetradecyl, hexadecyl and heptadecyl radicals.

Preferred are such dyestuffs of Formula I wherein $R_1$ stands for the methyl group and $R_2$ denotes the hexadecyl group or wherein $R_1$ and $R_2$ denote an octyl group.

As acylamino groups for $Z_1$ should preferably be mentioned: the acetylamino, propionylamino, butyrylamino and benzoylamino group.

The dyestuffs of the Formula II according to the invention are prepared by reacting 3'-hydroxy-quinophthalone-carboxylic acid halides of the formula

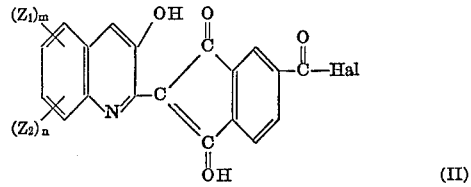

in which $Z_1$, $Z_2$, $m$ and $n$ have the same meaning as in Formula I and Hal denotes a halogen atom, preferably a chlorine atom, with secondary amines of the formula

in which $R_1$ and $R_2$ have the same meaning as in Formula I.

The carboxylic acid halides of the Formula II required as starting materials can be prepared by condensation of trimellitic acid anhydride with, for example, 2-methyl-3-hydroxy-quinoline-4-carboxylic acid and subsequent conversion of 3'-hydroxy-quinophthalone-carboxylic acid into the halide in the usual way by treatment with acid-halogenating agents, preferably thionyl chloride.

Instead of 2-methyl-3-hydroxy-quinoline-4-carboxylic acid, the following quinoline derivatives may also serve as starting material for the preparation of 3'-hydroxy-quinophthalone-carboxylic acid halides of the general Formula II:

2-methyl-3-hydroxy-5-chloroquinoline-4-carboxylic acid
2-methyl-3-hydroxy-6-chloroquinoline-4-carboxylic acid
2-methyl-3-hydroxy-6-bromoquinoline-4-carboxylic acid
2-methyl-3-hydroxy-6-nitroquinoline4-carboxylic acid
2-methyl-3-hydroxy-6-methoxy-quinoline-4-carboxylic acid
2-methyl-3-hydroxy-6-methylquinoline-4-carboxylic acid
2-methyl-3-hydroxy-6-acetylaminoquinoline-4-carboxylic acid
2-methyl-3-hydroxy-6,7-dichloroquinoline-4-carboxylic acid
2-methyl-3-hydroxy-6,8-dichloroquinoline-4-carboxylic acid
2-methyl-3-hydroxy-6,8-dibromoquinoline-4-carboxylic acid
2-methyl-3-hydroxy-5,6,8-trichloroquinoline-4-carboxylic acid
2-methyl-3-hydroxy-6-chloro-8-methyl-quinoline-4-carboxylic acid
2-methyl-3-hydroxy-7-chloro-8-methyl-quinoline-4-carboxylic acid
2-methyl-3-hydroxy-6-chloro-5,8-dimethylquinoline-4-carboxylic acid.
2-methyl-3-hydroxy-5-methyl-8-methoxy-quinoline-4-carboxylic acid
2-methyl-3-hydroxy-6-chloro-7-bromo-8-methyl-quinoline-4-carboxylic acid 2-methyl-3-hydroxy-5-methyl-6-chloro-8-methoxy-
quinoline-4-carboxylic acid
2-methyl-3-hydroxy-5,6-benzoquinoline-4-carboxylic acid
2-methyl-3-hydroxy-6,7-benzoquinoline-4-carboxylic acid
2-methyl-3-hydroxy-7,8-benzoquinoline-4-carboxylic acid.

Secondary amines to be used according to the invention are, for example:

di-n-octyl-amine,
bis-(α-methyl-n-heptyl)-amine,
bis-(2-ethylhexyl)-amine,
dinonylamine,
didecylamine,
diundecylamine,
didodecylamine,
ditridecylamine,
ditetradecylamine,
dipentadecylamine,
dihexadecylamine,
diheptadecylamine,
butyl-dodecylamine,
iso-butyl-dodecylamine,
pentyl-dodecylamine,
(1,3-dimethylbutyl)-dodecylamine,
methyl-hexadecylamine,
ethyl-hexadecylamine,
butyl-hexadecylamine,
methyl-heptadecylamine,
methyl-octadecylamine.

Condensation of the 3'-hydroxy-quinophthalone-carboxylic acid halides of the Formula II with the secondary amines of the Formula III to form the dyestuffs of the Formula I according to the invention is carried out at temperatures of 60–220° C., preferably at 120–180° C., in the presence of acid-binding agents, such as sodium acetate, pyridine, quinoline, triethylamine or dimethylaniline, advantageously in inert organic solvents, such as toluene, chlorobenzene, o-dichlorobenzene, trichlorobenzene, nitrobenzene, pyridine or quinoline.

The dyestuffs so obtained are very readily soluble in organic solvents, particularly in solvents which are essentially not water-miscible; they are eminently suitable for the continuous dyeing of synthetic fibre materials from organic solvents.

For dyeing with the dyestuffs according to the invention, it is advantageous to use solvents which are essentially not water-miscible and the boiling points of which lie between 40 and 150° C., for example, aromatic hydrocarbons, such as toluene or xylene; aliphatic halogenated hydrocarbons, especially chlorinated hydrocarbons, such as methylene chloride, chloroform, carbon tetrachloride, dichloroethane, trichloroethane, tetrachloroethane, dichloropropane, chlorobutane and dichlorobutane; as well as aliphatic fluorinated and fluorochlorinated hydrocarbons, such as perfluoro-n-hexane, 1,2,2-trifluoro-trichloroethane and trifluoro-pentachloropropane; aromatic chlorinated and fluorinated hydrocarbons, such as chlorobenzene, fluorobenzene, chlorotoluene and benzotrifluoride.

Tetrachloroethylene, trichloroethylene, 1,1,1-trichloroethane and 1,1,1-trichloropropane have proved particularly satisfactory. Mixtures of these solvents can also be used.

The continuous dyeing of synthetic fibre materials with the dyestuffs according to the invention from organic solvents is carried out by impregnating the materials with dyeing liquors which contain the dyestuffs of the Formula I, and subsequently subjecting them to a heat treatment.

To prepare the dyeing liquors, the dyestuffs according to the invention are dissolved in the organic solvents which are essentially not water-miscible, or they are added to the latter in the form of solutions in solvents of unlimited miscibility with these solvents, such as alcohols, dimethyl formamide, dimethyl acetamide, dimethyl sulphoxide or sulpholane; the synthetic fibre materials are impregnated with the resultant clear dyestuff solutions which may also contain soluble non-ionic auxiliaries for improving the levelness of the dyeings, for example, the known interface-active ethoxylation and propoxylation products of fatty alcohols, alkyl-phenols, fatty acid amides and fatty acids.

The heat treatment for fixation of the dyestuffs on the fiber materials may consist in a brief treatment with dry heat at 120–230° C., the heat treatment being optionally preceded by an intermediate drying; or the fiber materials may be treated in an overheated solvent vapor at 100–150° C. Small amounts of non-fixed dyestuff particles can be washed out by a brief treatment with the cold organic solvent. It should be noted that mixtures of the dyestuffs according to the invention sometimes give a better dyestuff yield than the individual dyestuffs and that they may exhibit an even better solubility in the organic medium.

According to the process described above, yellow dyeings which are characterized by a high dyestuff yield, very good build-up and outstanding fastness properties; especially very good fastness to thermofixing, washing, rubbing and light, are obtained with the dyestuffs according to the invention on synthetic fiber materials of, e.g. polyesters, especially polyethylene terephthalates, polycyclohexane-dimethylene terephthalate or polycarbonates from 2,2-bis-(p-hydroxyphenyl)-propane; of cellulose triacetate; synthetic polyamides, such as polyhexamethylene-diamine adipate, poly-ε-caprolactam or poly-ω-amino-undecanic acid; polyurethanes and polyolefines.

The parts given in the following examples are parts by weight.

EXAMPLE 1

A suspension of 35.2 parts 3'-hydroxy-quinophthalone-5-carboxylic acid chloride in 150 parts o-dichlorobenzene is heated to 90° C., and 26.5 parts bis-(2-ethyl-hexyl)-amine and 9 parts pyridine are simultaneously added while stirring. The reaction mixture is heated at boiling temperature under reflux for 2 hours, the o-dichlorobenzene is then removed by steam distillation, and the dyestuff of the formula

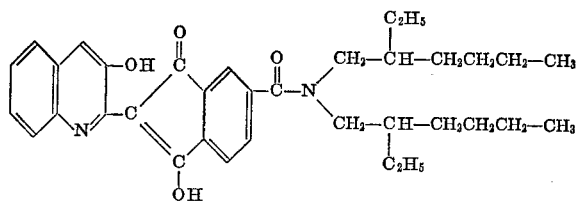

is obtained as residue in the form of a brown-yellow oil.

Analogous dyestuffs with equivalent properties were obtained when the bis-(2-ethyl-hexyl)-amine was replaced with the equivalent amount of one of the following amines: di-n-octylamine, bis-(α-methyl-n-heptyl)-amine, dinonylamine, diundecylamine, didodecylamine, diheptadecylamine.

EXAMPLE 2

A suspension of 38.6 parts 3'-hydroxy-6'-chloro-quinophthalone-5-carboxylic acid chloride in 200 parts chlorobenzene is heated to 60° C., and 29.5 parts methyl-stearyl-amine and 13.5 parts dimethyl-aniline are simultaneously added. The reaction mixture is heated at boiling temperature under reflux for 2 hours, the chlorobenzene is subsequently removed by stream distillation, and a dyestuff of the formula

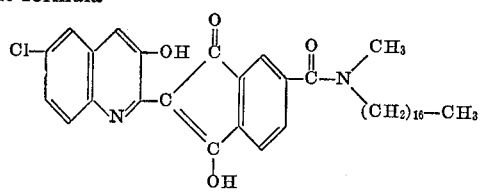

is obtained as residue in the form of a yellow-brown oil.

Analogous dyestuffs with equivalent properties were obtained when the methyl-stearylamine was replaced with the equivalent amount of one of the following amines: butyl-dodecylamine, pentyl-dodecylamine (1,3-dimethyl-butyl)-dodecylamine, methyl-hexadecylamine, ethyl-hexadecylamine, butyl-hexadecylamine, methyl-octadecylamine, or of the amines mentioned in Example 1. Moreover, the following substituted quinophthalone-carboxylic acid chlorides were reacted under the conditions described in Examples 1 and 2:

38.6 parts 3′-hydroxy-5′-chloro-quinophthalone-5-carboxylic acid chloride 43 parts 3′-hydroxy-6′-bromo-quinophthalone-5-carboxylic acid chloride 36.5 parts 3′-hydroxy-6′-methyl-quinophthalone-5-carboxylic acid chloride 39.6 parts 3′-hydroxy-6′-nitro-quinophthalone-5-carboxylic acid chloride 40.8 parts 3′-hydroxy-6′-acetylamino-quinophthalone-5-carboxylic acid chloride 42 parts 3′-hydroxy-6′,7′-dichloro-quinophthalone-5-carboxylic acid chloride 38.2 parts 3′-hydroxy-6′-methoxy-quinophthalone-5-carboxylic acid chloride Analogous dyestuffs were obtained.

EXAMPLE 3

A fabric of polyethylene-terephthalate fibers is impregnated at room temperature with a clear yellow solution containing: 10 parts of the dyestuff described in Example 1 in 990 parts tetrachloroethylene.

After squeezing to a weight increase of 60%, the fabric is dried at 80° C. for 1 minute. The dyestuff is subsequently fixed by heating the fabric at 190–220° C. for 45 seconds. The small proportion of non-fixed dyestuff is subsequently washed out by a short treatment in cold tetrachloroethylene. After drying, there is obtained a clear yellow dyeing which is characterized by its high dyestuff yield, very good build-up as well as by outstanding fastness properties, especially very good fastness to thermofixing, washing, rubbing and light.

Equally satisfactory clear yellow dyeings were obtained in an analogous manner on fabrics of (a) cellulose triacetate
(b) synthetic polyamides or polyurethanes and
(c) polypropylene fibers, but thermosolization was carried out for
(a) at 200–220° C.
(b) at 170–200° C. and
(c) at 120–150° C.

Equally satisfactory dyeings were also obtained when the 990 parts tetrachloroethylene were replaced with the same amount of one of the following solvents: methylene chloride, chloroform, carbon tetrachloride, dichloroethane, trichloroethylene, tetrachloroethane, dichloropropane, 1,1,1-trichloropropane, chlorobutane, dichlorobutane, perfluoro-n-hexane, 1,2,2-trifluoro-trichloroethane and trifluoro-pentachloropropane.

We claim:

1. 3′-hydroxy-quinophthalone dyestuff free from sulfonic acid groups, adjacent t-butyl groups and adjacent nitro groups, having the formula

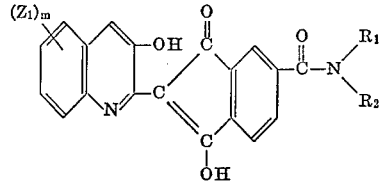

in which $R_1$ and $R_2$ independently of one another are $C_1$–$C_{17}$-alkyl and the total of carbon atoms in $R_1$ and $R_2$ is 16–25; $Z_1$ is halogen, nitro, $C_1$–$C_4$-alkyl, $C_1$–$C_4$-alkoxy or acetylamino; and $m$ is an integer from 0 to 3.

2. 3′-hydroxy-quinophthalone dyestuff of claim 1 in which $m$ is 0.

3. 3′-hydroxy-quinophthalone dyestuff of claim 1 in which $m$ is 0; $m$ is 1 and $Z_1$ is 5-chloro, 6-chloro, 6-bromo, 6-nitro, 6-methoxy, 6-methyl or 6-acetylamino; or $m$ is 2 and $Z_1$ is 6,7-dichloro, 6,8-dichloro, 6,8-dibromo, 6-chloro-8-methyl, 7-chloro-8-methyl or 5-methyl-8-methoxy; or $m$ is 3 and $Z_1$ is 5,6,8-trichloro, 6-chloro-5,8-dimethyl, 6-chloro-7-bromo-8-methyl, or 5 - methyl - 6 - chloro-8-methoxy.

4. 3′-hydroxy-quinophthalone dyestuff of claim 1 in which $R_1$ is methyl; and $R_2$ is n-$C_{17}H_{35}$.

5. 3′-hydroxy-quinophthalone dyestuff of claim 1 in which $R_1$ and $R_2$ are octyl.

6. 3′-hydroxy-quinophthalone dyestuff free from sulfonic acid groups having the formula

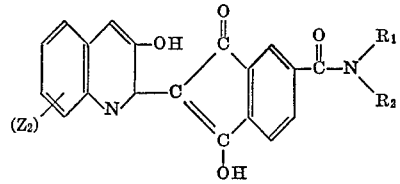

in which $R_1$ and $R_2$ independently of one another are $C_1$–$C_{17}$-alkyl and the total of carbon atoms in $R_1$ and $R_2$ is 16 to 25; and $Z_2$ is a fused benzene ring fused in the 5- and 6-, the 6- and 7-, or the 7- and 8-position.

References Cited

UNITED STATES PATENTS

| | | | |
|---|---|---|---|
| 3,023,212 | 2/1962 | Richter | 260—286 |
| 3,023,213 | 2/1962 | Richter | 260—287 |
| 3,374,238 | 3/1968 | Wick | 260—287 R |

DONALD G. DAUS, Primary Examiner

U.S. Cl. X.R.

8—162, 177, 178, 179, 542; 260—287 R